United States Patent [19]

Miyawaki et al.

[11] Patent Number: 4,601,563
[45] Date of Patent: Jul. 22, 1986

[54] MOTOR DRIVEN FOCAL LENGTH CHANGING DEVICE FOR A CAMERA

[75] Inventors: Makoto Miyawaki, Kanagawa; Michio Hirohata, Tokyo; Yukio Ogawa, Kanagawa; Takanori Kodaira, Tokyo, all of Japan

[73] Assignee: Canon Kabushiki Kaisha, Tokyo, Japan

[21] Appl. No.: 664,685

[22] Filed: Oct. 25, 1984

[30] Foreign Application Priority Data

Nov. 2, 1983 [JP] Japan .............................. 58-204940

[51] Int. Cl.[4] .................................................. G03B 3/00
[52] U.S. Cl. .............................. 354/195.1; 354/173.1; 354/400
[58] Field of Search ................... 354/400, 402, 195.1, 354/195.12, 173.1, 214, 403

[56] References Cited

U.S. PATENT DOCUMENTS

| | | | |
|---|---|---|---|
| 4,294,527 | 10/1981 | Hashimoto et al. | 354/403 |
| 4,295,715 | 10/1981 | Breen | 354/400 |
| 4,346,972 | 8/1982 | Takahashi | 354/400 |
| 4,364,649 | 12/1982 | Mamiya et al. | 354/400 |

*Primary Examiner*—Russell E. Adams
*Attorney, Agent, or Firm*—Toren, McGeady, Stanger, Goldberg & Kiel

[57] ABSTRACT

In the automatic film transportation type camera using an electric motor in which upon a forward rotation thereof the film is wound and upon a reversed rotation thereof the film is rewound, a mechanism for moving a photographic lens barrel between a standard or wide angle setting and a telephoto setting is provided with a clutch capable of transferring the motion of the motor from a rewind fork to the moving mechanism, and a switch arranged to be closed when the clutch is cut off, thereby the motor is energized to rotate in the reverse direction, driving the barrel to move axially from one of the settings to the other, while leaving the rewind fork stationary.

4 Claims, 3 Drawing Figures

MOTOR DRIVEN FOCAL LENGTH CHANGING DEVICE FOR A CAMERA

BACKGROUND OF THE INVENTION

1. Field of the Invention

This invention relates to cameras having a built-in lens capable of focal length changeability and more particularly to the motorized change of the focal length of a photographic lens in such camera.

2. Description of the Prior Art

The prior-known mechanisms for changing the focal length of the photographic lens of a camera between two different values, as, for example, disclosed in U.S. Pat. No. 3,388,650, are adapted to be used with optical systems of such types in which: the combination of the lens components is altered (for example, the rear converter type); a lens of positive power and a lens of negative power are moved according to a prescribed rule (for example, the zoom lens type); and short and long focal length lenses are interchangable.

Since the operation of changing the focal length of any of these types of optical systems requires a distance which is far longer than that of the focusing and a very complicated manner, automation of the focal length changing operation through the use of a simple structure such as the one used in the focusing operation which is automated by use of a spring, has been difficult to achieve.

Therefore, most of the focal length changing mechanisms have been operated either with the help of a force from the outside, such that an actuator provided on the photographic lens barrel or on the camera housing is moved manually (for example, Japanese Patent Publication No. Sho 56-50504), or with the use of an electric motor solely adapted for that purpose (for example, Japanese Laid-Open Patent Application No. Sho 57-146232).

Also, in application of this motorization of the photographic lens to cameras of the type in which the winding and rewinding of film is carried out by a separate electrical motor, problems arise in relation to the cost and the availability of space within the camera housing, leading to an increase in the production cost as well as the bulk and size of the camera. To create a motor driven focal length changing device for this type of camera, many difficult problems have been left unsolved.

SUMMARY OF THE INVENTION

It is an object of the present invention to eliminate such problems and to provide a camera in which a gear train for the automatic rewinding of film is provided with clutch means of a simple structure arranged to respond to one touch of an actuator, thereby transferring the motion of a common electric motor from the rewind fork to the motion used to move a photographic lens barrel from one of two settings to the other.

Other objects of the present invention will become apparent from the following description of an embodiment thereof.

DETAILED DESCRIPTION OF THE PREFERRED EMBODIMENT

Figure 1:
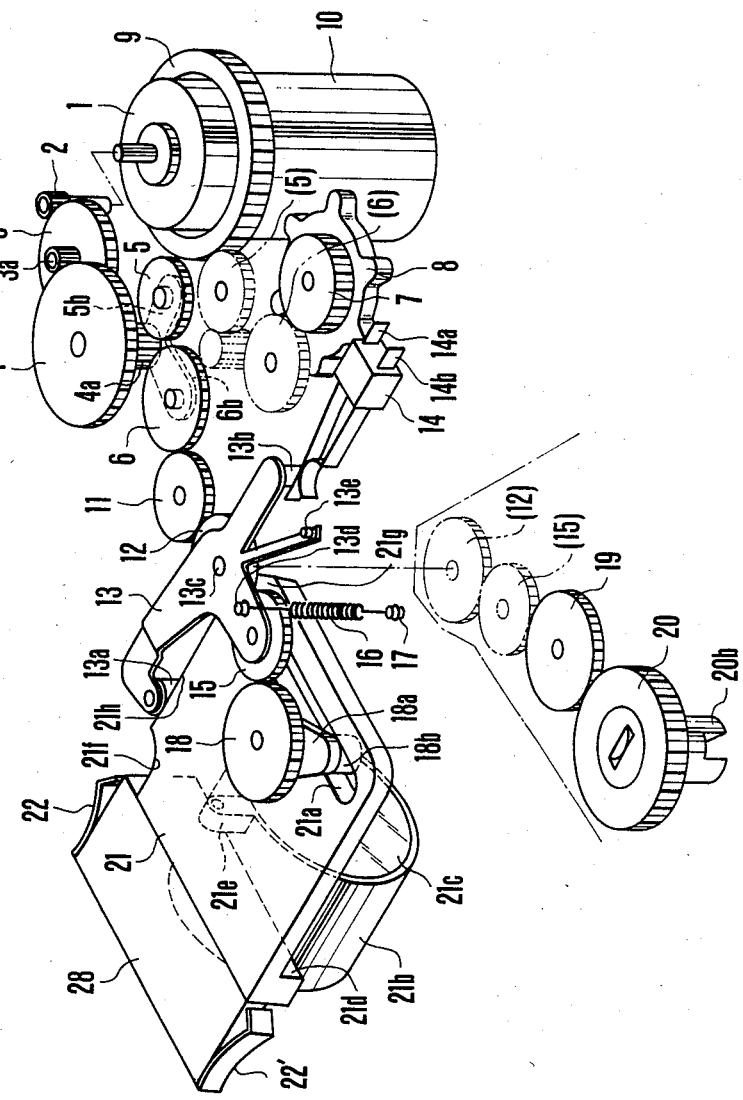
FIG. 1 is an exploded perspective view of an embodiment of a motor driven focal length changing device for the camera according to the present invention.

One embodiment of the motor driven focal length changing device for the camera according to the invention is described with reference to the drawings. Referring first to FIG. 1, a reversible electric motor 1 is used as a common drive source not only for winding and rewinding the film and charging the shutter and other portions of the camera, but also for setting a photographic lens in either one of two axial positions and, in this instance, positioned in a space within a take-up spool 10. A pinion gear 2 on the output shaft of the motor 1 is connected to a speed reduction gear train with gears 3 and 3a on a common shaft and with gears 4 and 4a on another common shaft, and meshes with the gear 3. The gear 3a meshes with the gear 4.

A gear 5 on a spool clutch 5b is arranged to transmit rotation of the gear 4a to a geared ring 9 which is fixed on the outer diameter of the spool 10 at the upper end thereof only when the motor rotates in a direction which winds up the film. A gear 6 on another clutch lever 6a is arranged to transmit rotation of the gear 4a to either one of a sprocket gear 7 or an idler gear 11 when the motor 1 rotates either in the direction which winds the film or in the reverse direction which rewinds the film, respectively. A sprocket 8 receptive of rotation of the gear 7 advances the film through a prescribed length. It is to be noted that the spool clutch gear 5 and the winding-up clutch gear 6 always mesh with the gear 4a and are in frictional contact with the respective clutch levers 5b and 6b to switch the clutches.

A lever 13 of a letter T-shape is pivotally mounted on a common shaft 13c of a gear 12, and is urged in the counter-clockwise direction by a spring 16 of which one end is hooked on a pin 13d and the other end is hooked on a pin 17 on a frame-work (not shown) of the camera body. When the lever 13 is turned in the clockwise direction against the bias force by the photographer's finger touching on a knob 13e, a gear train 11→(12)→(15)→19→20 which is normally closed, terminating at a fork 20b, is opened as one gear 15 is taken out of a mesh with the gear 19 and is brought into mesh with a TELE/WIDE gear 18. Therefore, motion of the motor 1 is transferred to the TELE/WIDE gear 18. The gear 15 is rotatably carried on the end of the down stroke of the lever 13, of which the cross-stroke has a roller 13a at the left hand end and an actuator pin 13b for a switch 14 at the right hand end. A crank web 18a is fixed to a shaft on which the TELE/WIDE gear 18 is mounted and has a crank pin 18b extending into a laterally elongated slot 21a of a slide plate 21. As the crank web 18a rotates, the slide plate 21 which is fixedly carrying a photographic lens 21c and a lens barrel 21b with a barrel hanger 21e on a flange 21d is moved axially between the telephoto and wide angle positions. At the front of the slide 21 there is shown a barrel cover plate 28 provided with locating leaf springs 22 and 22' on the right and left hand sides thereof, respectively. The switch 14 has contacts 14a and 14b arranged to be engaged with each other by the actuator pin 13b when the lever 13 is turned in the clockwise direction until the gear 15 engages with the TELE/WIDE gear 18. During a time other than that of this meshing engagement, the switch 14 is open. When this switch 14 is closed, the motor 1 is energized to rotate in the reverse direction.

Soon after the start of rotation of the motor 1, as the slide plate 21 starts to move either forward or rearward, the roller 13a is expelled from either one of the wide angle and telephoto setting cam recesses 21f and 21g at the front and rear corners of the slide plate 21 respectively and then rides on an axially parallel camming surface 21h. Therefore, soon after the knob 13e is actuated by one touch, the photographer may remove his finger from the knob 13e, since the meshing engagement of the gears 15 and 18 is sustained by the roller 13a against the force of the returning spring 16. Then when the photographic lens 21c reaches the opposite setting position (telephoto or wide angle position), the roller 13a is driven by the spring 16 to immediately drop in the TELE or WIDE cam recess 21g or 21f, thereby the gear 15 is automatically taken out of mesh with the TELE/WIDE gear 18 and the switch 14 is also automatically turned off. During a time other than that when the focal length change is in operation, the train of the gears 11, 12, 15, 19 and 20 is maintained effectively, allowing a film rewinding operation to be initiated at any desired time. As the motor 1 rotates in the reverse direction, this gear train transmits motion of the motor 1 to the rewind fork 20b therethrough, while the exposed film is being transported from the take-up spool 10 to a supply spool in a film cartridge or patrone (not shown).

Figure 2:
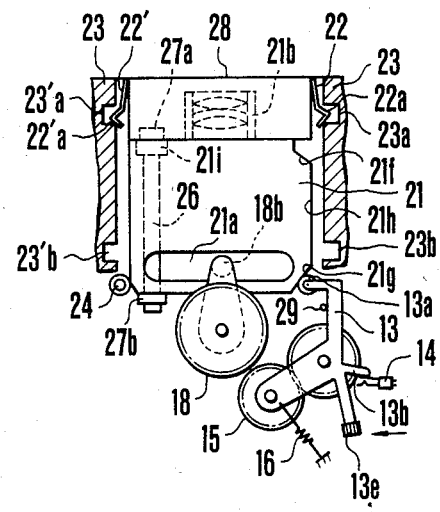
FIGS. 2 and 3 are plan views of the mechanism for moving the photographic lens barrel between the first and second settings respectively.
Figure 3:
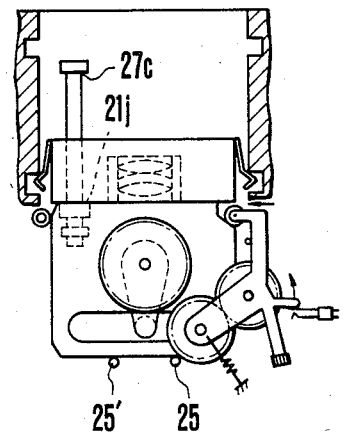

FIGS. 2 and 3 are plan views, partly in section, of a locating mechanism for the focal length changing device of the invention in two different operative positions for the photographic lens at the telephoto and wide angle positions respectively, where the same reference characters have been employed to denote the similar parts as those shown in FIG. 1. An outer barrel 23 fixedly mounted on the camera housing (not shown) is provided with a pair of detent recesses 23a and 23'a for the standard photographic setting near the front end thereof in diametrically aligned relation to each other and another pair of detent recesses 23b and 23'b for the telephoto photographic setting near the rear end thereof in diametrically aligned relation to each other. The locating leaf springs 22 and 22' on the side walls of the barrel cover plate 28 extending outwardly from the front end of the slide plate 21 are self-biased to expand in the diametrical direction of the outer barrel 23, have their end portions formed almost in a V-shape, and are arranged to engage either in the detent recesses 23a and 23'a or in the second pair of recesses 23b and 23'b, as the slide plate 21 is pulled out to the prescribed standard focal length setting position or retracted to the prescribed telephoto setting position, respectively. A reaction member in the form of a pin of which the outer periphery is lubricated, or a smoothly rotatable guide roller lies in an opposed relation to the roller 13a across the slide plate 21 so that the left hand side edge of the slide plate 21 is pressed against the reaction member 24 by the spring 16 acting on the roller 13a to restrain the slide plate 21 from unnecessary lateral movement, while not hindering axial movement of the barrel 21b. A guide rail 26 is laid at both ends on the respective mounts 27a and 27b fixedly secured to the framework of the camera body and runs in an axial direction. Fitted in a slidable manner on the guide rail 26 is a ring-shaped collet 21i fixedly secured to the slide plate 21. Two stoppers 25 and 25' limit the rearward axial movement of the slide plate 21. In this position, the leaf springs 22 and 22' in engagement with the recesses 23b and 23'b press the slide plate 21 against the stoppers 25 and 25'. The forward axial movement of the slide plate 21 is limited by the rear wall 27c of the front mount base 27a when the front wall 21j of the collet 21i abuts thereon. In this position, the leaf springs 22 and 22' in engagement with the front pair of recesses 23a and 23'a press the slide plate 21 against the mount base 27a. An additional stopper 29 limits the counterclockwise movement of the lever 13. It is to be noted that the width of the slot 21a is wider than the diameter of the pin 18b.

The operation of the camera is described next with reference to FIGS. 1 to 3.

Before describing the focal length changing operation, let us look through the operation of the film transporting mechanism.

The spring 16 holds the lever 13 in the counter-clockwise turned position about the shaft 13c where the roller 13a drops in either one of the TELE and WIDE cams 21g and 21f (FIG. 2 or FIG. 3). At this time, the gear 15 is not meshing with the TELE/WIDE gear 18, but instead with the gear 19. The switch 14 is opened.

When in the film wind-up mode, the motor 1 rotates in the forward (counterclockwise) direction. At this time, the spool clutch 5b and the wind-up clutch 6b turn in the counterclockwise direction independent of each other, thereby the spool clutch gear 5 is brought into a meshing engagement with the spool gear 9 and the wind-up clutch gear 6 into a meshing engagement with the sprocket gear 7. Therefore, the driving torque of the motor 1 is transmitted through the gear train 2-3-3a-4-4a-(5)-8 to the spool 10 on which the film is wound up, and through the gear train 2-3-3a-4-4a(6)-7 to the sprocket 8 by which the film is advanced one frame. Since, in this film winding operation, the idler gear 11 is not meshing with the wind-up clutch gear 6, the driving torque of the motor 1 is not transmitted to the gears that follow the idler gear 11.

In the film rewind mode, a mode selector switch (not shown) is operated so that the motor 1 rotates in the reverse (clockwise) direction, and the spool clutch 5b and the wind-up clutch 6b turn in the clockwise direction. Thereby, the spool and wind-up clutch gears 5 and 6 are taken out of mesh with the spool gear 9 and the sprocket gear 7 and then brought into a meshing engagement with the idler gear 11. The driving torque of the motor is, therefore, transmitted through the gear train 2-3-3a-4-4a-6-11-(12)-(15)-19-20 to turn the fork 20b in the clockwise direction. Thus, the film is rewound on the supply spool in the cartridge.

For note, though the foregoing description has overlooked how the two clutches 5b and 6b are switched, it will now be explained in connection to this that a frictional force is exerted in each of the pairs of the gears 5 and 6 and the clutches 5b and 6b due to the driving torque transmission gear trains 2-3-3a-4-4a-5-6, automatically switching the clutches 5b and 6b independent of each other.

Let us now describe the operation of the focal length changing device in steps. The device is assumed to be in the position of FIG. 2. When the control knob 13e is pushed to the left against the force of the spring 16, the lever 13 is turned in the clockwise direction, thereby the gear 15 is taken out of mesh with the gear 19 and is brought into mesh with the TELE/WIDE gear 18, and at the same time, the roller 13a is removed from the TELE cam 21g. Just after that, the actuator pin 13b then pushes the movable contact 14a to the fixed contact 14b, thereby closing the switch 14. Then, the motor 1 starts to rotate in the reverse direction. Therefore, as has been described above, the normal film rewinding gear train is established to transmit the reverse rotation of the motor 1 to the gear 12. But, because the lever 13 is turned in the clockwise position, the rotation of the gear 15 is transferred to the TELE/WIDE gear 18 by which the crank pin 18b is turned in the counterclockwise direction while the slide plate 21 is pushed at the rear wall of the lateral slot 21a. Therefore, the lens barrel 21b starts to move rearwardly. Just when the roller 13a rides on the cam 21h, the lever 13 can no longer turn in the counterclockwise direction. Thus, the driving torque transfer clutch is retained in this state.

As the crank pin 18b is further turning toward the rear position, the lens barrel 21b and slide plate 21 reach a position slightly ahead of the prescribed setting position, and the V-shaped portions 22a and 22'a of the locating leaf springs 22 and 22' urge themselves to drop into the detent recesses 23b and 23'b. After that, the lens barrel 21b and the slide plate 21 are no longer driven by the crank pin 18b but by the leaf springs 22 and 22' to move to the prescribed setting position where the rear end of the slide plate 21 abuts onto the stoppers 25 and 25'. At this time, the roller 13a drops into the WIDE cam 21f, thereby the lever 13 is turned in the counterclockwise direction by the spring 16 to take the gear 15 out of mesh with the TELE/WIDE gear 18, and to turn off the switch 14. Thus, the operation of changing the focal length from the telephoto to the wide angle is completed (see FIG. 3).

It is to be noted here that such leaf spring-driven movement of the slide plate 21 causes the front wall of the lateral slot 21a to lie nearer to the crank pin 18a as shown in FIG. 3. It is also to be noted that during the time when the slide plate 21 moves along with the lens barrel 21b, the slide plate 21 is guided not only by the guide rail 26 but also by the combination of the roller 13a and the reaction roller 24 in order to insure that the optical axis of the lens 21c is prevented from becoming decentered or inclined.

Next an explanation of the operation which is reverse to that of the above-described operation, or the operation of changing the focal length from the standard or wide angle to the telephoto is given.

When the control knob 13e is pushed to the left, the lever 13 is turned in the clockwise direction, thereby the roller 13a is removed from the WIDE cam 21f and at the same time the gear 15 is engaged with the TELE/WIDE gear 18, and the switch 14 is turned on. Thereby the reverse rotation of the motor 1 is transmitted through the above-described gear train to the crank pin 18b. The crank pin 18b pushes the slide plate 21 at the front wall of the slot 21a. Thereby the slide plate 21 is moved forward along with the barrel 21b. At this time, the roller 13a rides on the cam 21h so that the lever 13 can no longer turn in the backward or counterclockwise direction. Thus, the transfer clutch is maintained in the operative position.

As the crank pin 18b is further turning toward the front position, when the slide plate 21 with the lens barrel 21b reaches a position slightly ahead the prescribed setting position, the leaf springs 22 and 22' urge their V-shaped portions to drop into the detent slots 23a and 23'a. After that, the slide plate 21 no longer relies on the driving power from the motor 1 and is driven by the leaf springs 22 and 22' to move further until the front wall 21j of the collet 21i abuts on the rear wall 27c of the mount base 27a of the guide rail 26 and is held stationary by these leaf springs 22 and 22' in the prescribed setting position of FIG. 2. At this time, the roller 13a drops into the TELE cam 21g, thereby the lever 13 is turned in the clockwise direction, the gear 15 is taken out of mesh with the TELE/WIDE gear 18, and the switch 14 is turned off to de-energize the motor 1. Such leaf spring driven movement of the slide plate 21 causes the rear wall of the lateral slot 21a to be laid nearer to the crank pin 18a.

As has been described above, one clutch is added to the rewinding gear train and is operatively connected to a one-way crank pin by which the photographic lens is driven to move between two different focal length settings. Thus, the automatic film transportation type camera is easily switched to a motor driven focal length changeable camera. With the addition of the capability to change the focal length, the photographic range of the camera is remarkably extended. Moreover, this can be dealt with by anyone, with great ease. Therefore, it can be said that the invention has achieved to doubly increase enchantment of the camera. Nevertheless, all that is required for introducing this capability is clutch means and switch means. Therefore, an unduly large increase in the production cost is avoided. Further, these means do not occupy a large space. Thus, the present invention has achieved a great advance in the performance of the camera without involving an unduly large increase in the production cost as well as the bulk and size of the camera.

What is claimed is:

1. A motor driven focal length changing device for a camera comprising:
    (a) a first transmission system for transporting a film;
    (b) a second transmission system for moving a lens to change the focal length;
    (c) a drive system;
    (d) a clutch for transferring the driving power of said drive system to either one of said first and said second transmission systems, said clutch making said first transmission system operative during ordinary operation;
    (e) actuating means for changing over said clutch so as to transmit the driving power of said drive system to said second transmission system, said means being operated manually; and
    (f) a switch for causing said drive system to move, said switch being rendered to an active switched condition in response to manual operation of said actuating means, whereby said drive system is energized.

2. A device according to claim 1, wherein said drive system includes an electric motor.

3. A motor driven focal length changing device for a camera comprising:
    (a) a first transmission system for winding a film;
    (b) a second transmission system for rewinding a film;
    (c) a third transmission system for moving a barrel to change the focal length;
    (d) a drive system;
    (e) a first clutch responsive to normal rotation of said drive system for transmitting the driving power of said drive system to said first transmission system, and responsive to reverse rotation of said drive system for transmitting the driving power of said drive system to said second transmission system;
    (f) a second clutch for transferring the driving power of said drive system to either one of said second and said third transmission systems, said second clutch making said second transmission system operative during ordinary operation;

(g) actuating means for changing over said second clutch so as to transmit the driving power or said drive system to said third transmission system, said means being operated manually;

(h) a switch for causing said drive system to be energized for reverse rotation, said switch being moved to an active switched position in response to manual operation of said actuating means, whereby said drive system is caused to rotate in a reversed direction.

4. A device according to claim 3, further comprising means for automatically returning said second clutch, said means taking action in response to the detection of the time when the focal length of a lens has changed.

* * * * *